INVENTOR:
JOSEPH D. EISLER
BY Newell Pottof
ATTORNEY

Nov. 13, 1956  J. D. EISLER  2,770,193
SEISMIC WAVE GENERATION
Filed Feb. 1, 1952  2 Sheets-Sheet 2

INVENTOR:
JOSEPH D. EISLER
BY Howell Pottaf
ATTORNEY

United States Patent Office 2,770,193
Patented Nov. 13, 1956

2,770,193
SEISMIC WAVE GENERATION

Joseph D. Eisler, Tulsa, Okla., assignor to Stanolind Oil and Gas Company, Tulsa, Okla., a corporation of Delaware Application February 1, 1952, Serial No. 269,500

7 Claims. (Cl. 102—23)

This invention relates to seismic geophysical surveying and is directed to the generation of seismic waves, particularly by the detonation of an explosive charge or charges in the air above a ground or water surface.

Seismic geophysical surveying involving the generation and detection of artificial seismic waves has been carried on for a number of years employing as the energy sources charges of explosive placed in shot holes drilled in the earth's surface. More recently it has been demonstrated that satisfactory artificial seismic waves can be generated by the detonation of explosive charges in the air above the ground surface. The technique of using charges detonated in the air for seismic-wave creation has come into general use in some areas but has not substantially replaced the shot-hole wave-generation method for a number of reasons. Among these are the facts that the time and labor involved in setting up a pattern of charges are substantial, and that certain safety hazards exist during the time that the charges are in firing position before they are detonated, particularly while the electrical firing connections are being established.

It is accordingly a primary object of my invention to provide a method and apparatus for detonating explosive charges or charge patterns in the air for seismic wave generation with less time and labor and with greater speed and safety than exists with usual procedures. Another object is to provide a method and apparatus for air-blast seismic shooting by which the charge or charge pattern can be placed at any desired height above the ground or water surface, often greater than may be convenient in conventional practice. Other and further objects, uses, and advantages of the invention will become apparent as the description proceeds.

Briefly stated, the method and apparatus of my invention comprises placing an explosive charge or charges in a charge-launching device, which, when actuated from a remote location, propels the charge or charges upwardly into the air above the ground or water surface, and causing the detonation of the charge or charges when the desired height and distribution are reached. Thus, until the exact time when the charge detonation is desired, the charge or charges are concentrated at a location where they are protected against accidental discharge, and the electrical detonating leads are not spread out over the surface where electrical currents sufficient to cause detonation may be induced therein. Furthermore, the labor of setting up a charge pattern is substantially reduced in that substantially no more is required than for the detonation of a single charge.

This will be better understood by reference to the accompanying drawings illustrating typical embodiments and modifications of the invention and forming a part of this application, in which drawings—

Figure 1:
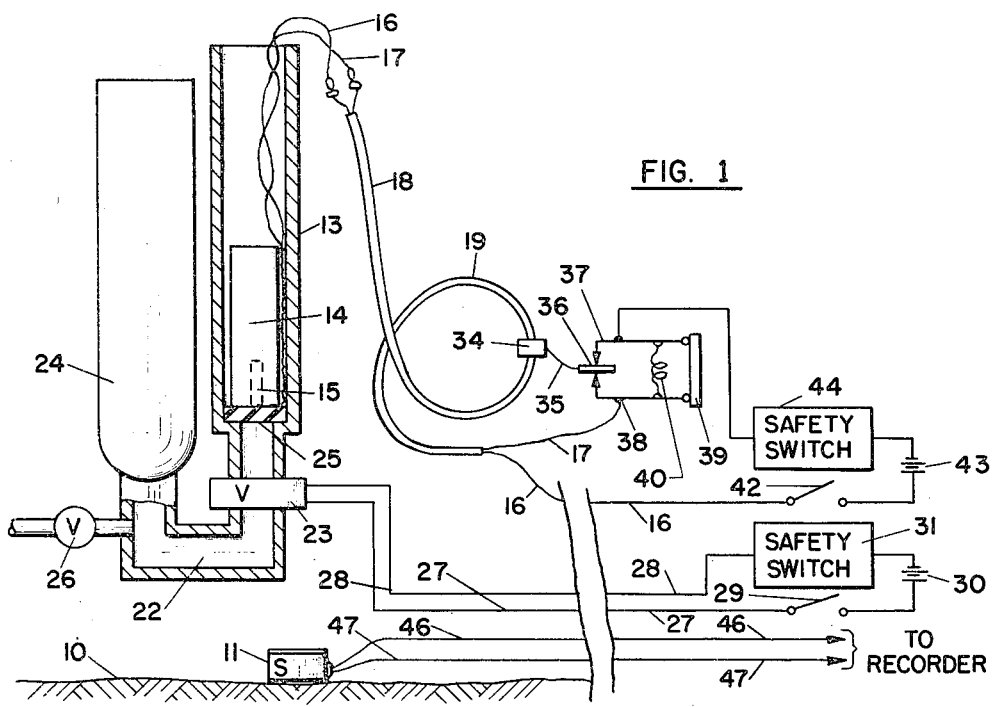
Figure 1 shows diagrammatically and with certain parts in cross section one embodiment of the invention as set up at a shot point, together with the actuating circuits located at a remote point.
Figure 3:
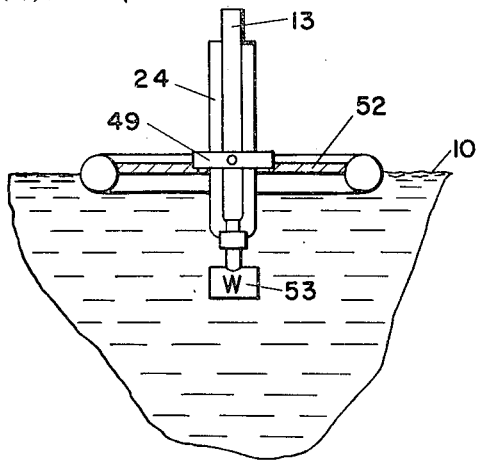
Figures 2 and 3 show mountings for the apparatus of the invention for use respectively on land and on water.

Referring now to these drawings in detail, and particularly to Figure 1 thereof, an embodiment of the invention is shown in firing position above a water or ground surface 10 where it is desired to generate seismic waves, the initiation of which waves in the ground is picked up by a seismometer 11 placed in contact with ground 10. The device of the invention comprises a launching tube 13 in which is placed a charge of explosive 14 of the weight desired for any particular location, which charge is provided at its lower end with a detonator 15 from which the electrical leads 16 and 17 are brought out to the upper end of tube 13 and attached to a two-conductor cable 18, the excess length of which forms a coil 19 on the surface 10.

Connected to the lower end of launcher tube 13 and controlled by a solenoid-operated valve 23 is a tubular conduit 22 leading to a pressure vessel 24 containing gas, for example, compressed air under considerable pressure, which gas has been introduced into vessel 24 through a valve 26 from a suitable source of supply such as a compressor (not shown). Charge 14 is normally slightly smaller in diameter than the inside diameter of launcher tube 13 so that detonating leads 16 and 17 from detonator 15 may pass between the charge and the tube wall. Accordingly, to prevent air from by-passing charge 14, there is provided beneath the charge a resilient disc 25 of rubber or the like making sealing contact with the inner wall of launcher tube 13.

A pair of insulated electrical leads 27 and 28 extend from the solenoid valve 23 to a remote location where they are coupled to an operating switch 29, a battery 30, and a safety switch or device 31 connected in series.

Attached to cable 18 at a suitable point in coil 19 is a clip 34 from which extends a flexible cord 35 to a block 36 of electrical insulation material between the contacts 37 and 38 of a switch 39, contacts 37 and 38 being drawn toward each other by a tension spring 40. Contacts 37 and 38 are in one of the leads of two-conductor cable 18 which extends to the remote location where connection is made to an operating switch 42, a battery 43, and a safety switch 44 coupled in series. From the seismometer 11 electrical leads 46 and 47 extend to a recorder, which may be of any conventional type.

In the operation of the invention as described thus far, pressure vessel 24 is first charged with compressed air to the desired pressure through the valve 26, which pressure is known from previous experience to be sufficient to project a given weight of charge at least to the desired height. The disc 25 is inserted into launcher tube 13, and the charge 14, provided with the detonator 15, is then lowered into the tube on top of the disc. The clip 34 is attached at a point of cable 19 such that when the charge approaches the desired height, the insulating block 36 will be jerked from between contact 37 and 38, thus closing the circuit to detonate the charge.

When these preparations have been completed, the personnel retires to the remote location at a safe distance from the shot-point location 10 where the switches 42 and 44 are closed to energize the firing circuit except for the open circuit at switch 39, safety switch 44 being of a type which normally remains open until positively held closed by the presence of personnel employed at the shot location, and safety switch 31 being similarly held closed by the operating personnel. Upon then closing the operating switch 29 to actuate solenoid valve 23, the pressure of the air from vessel 24 is applied to the bottom of charge 14, and it is propelled rapidly from the tube 13 and into the air above surface 10. Coil 19 of cable 18 is payed out by the upward motion of charge 14 until block 36 is jerked from between contacts 37 and 38, which contacts then close and complete the firing circuit, detonating charge 14 at the proper predetermined height.

Figure 2:
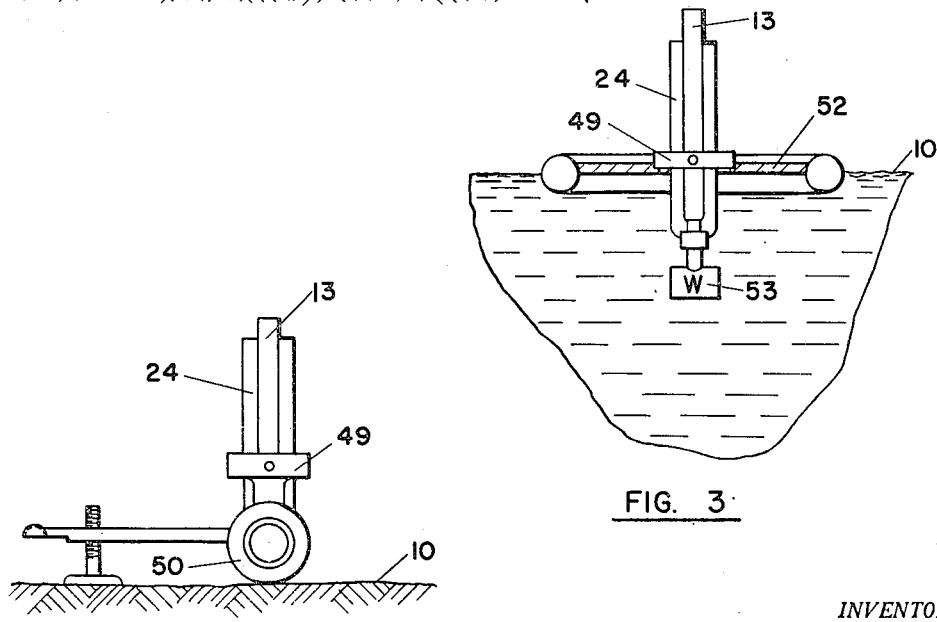

For use on land the launcher 13 and vessel 24 are preferably mounted as shown in Figure 2 in a gimbal mounting 49 carried by a trailer 50 which may be conveniently towed behind a motor vehicle. Gimbal mounting 49 insures that the barrel of launcher 13 always points in a substantially vertical direction.

For use in marine areas the gimbal-mounted launcher 13 is fastened to a float-supported platform 52, a weight 53 being attached to the bottom end of tube 13 to insure that it remains upright in the water. Cable coil 19, seismometer 11, and switch 39 are normally placed on platform 52, from which additional cable is laid through the water to the shooting boat at a safe distance from the shot point.

Figure 4:
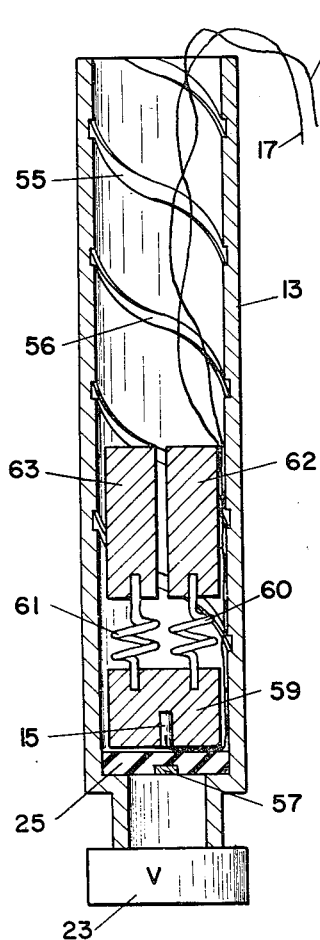
Figure 4 is a cross-section view of the launcher of the invention in an alternative embodiment thereof.
Figure 5:
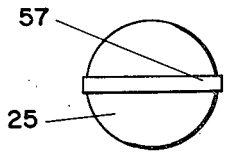
Figure 5 shows a charge rotating device.

In Figure 4 is shown an embodiment of the invention adapted to provide a pattern of charges in the air above the surface 10. In this drawing only two charges of a multiple-charge pattern are shown, but it will be immediately apparent how any number of such charges can be provided. Launcher tube 13 in this embodiment is provided with internal helical grooves 55 and 56 extending the length of the tube, in which grooves fits a cross member 57 attached to rubber disc 25 as shown in Figure 5. Electric detonator 15 is imbedded in a center detonating charge 59 which is connected through folded Primacord or similar detonating fuses 60 and 61 respectively to the multiple main explosive charges 62 and 63.

Figure 6:
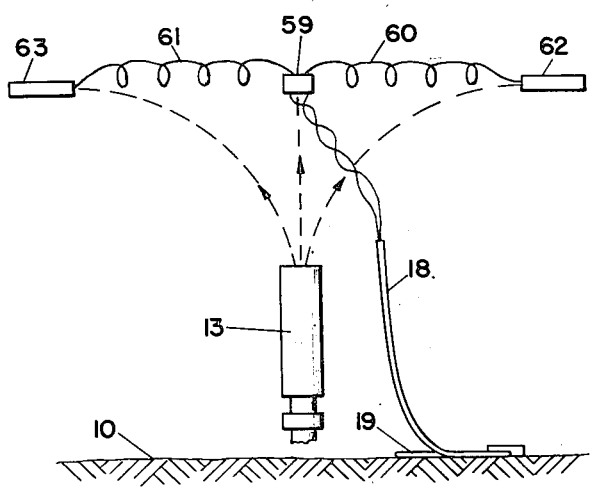
Figure 6 shows in elevation a pattern of charges obtained in the operation of the embodiment of Figure 4.

When air pressure is suddenly applied through valve 23 and these charges are rapidly thrown upwardly out of launcher tube 13, the projections 57 engaging grooves 55 and 56 impart to the various charges a rotation of considerable magnitude so that, after these charges leave the end of launcher 13, they spread out radially as shown in Figure 6, the trajectories of the three charges being shown as dotted lines. As charges 59, 62, and 63 all have the same vertical velocity when they leave the end of launcher tube 13, they rise to the same height, but charges 62 and 63, due to their rotation, are thrown also outwardly radially from charge 59, paying out Primacord fuses 60 and 61. When these charges reach the desired height above ground surface 10, the actuation of the switch 39 by the cable 18 detonates center charge 59 and, through the detonating fuses 60 and 61, the respective charges 62 and 63.

Figure 8:
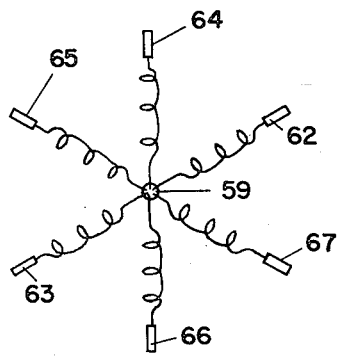
Figure 8 is a plan view of the charge pattern established by the charge of Figure 7.
Figure 7:
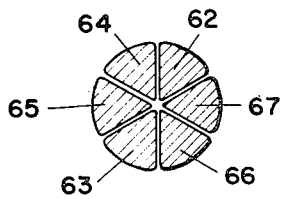
Figure 7 shows in cross section a preferred multiple-charge arrangement.

In Figure 7 is shown in cross section a preferred arrangement for the multiple charges used in the embodiment of Figure 4. Thus, for example, six charges are preferably arranged as shown in this figure as longitudinal sectors of a cylinder, the six charges 62, 63, 64, 65, 66, and 67 assuming the positions shown in plan view in Figure 8 when projected into the air in the manner described in connection with Figure 6, and all charges being simultaneously detonated by the detonating-fuse connections to the charge 59. The plan view of Figure 8 is the instantaneous position which may be assumed by these charges just before the moment of detonation.

While I have described my invention in terms of the foregoing specific embodiments, it is to be understood that still further modifications thereof will occur to those skilled in the art. For example, the multiple charges can be dispersed radially outwardly from the charge launcher by other means than the rotational method shown, as, for example, by applying part of the air pressure from vessel 34 to spread the charges as they leave the end of launcher tube 13. Likewise, a pattern of charges can be formed in the air above the ground or water surface by projecting each charge unit from a separate aimed barrel supplied with energy from a common pressure reservoir.

Also, instead of detonating the charge by pay-out of the firing lead, the detonating circuit can be closed by a hand-operated switch or by an automatic electrical delay circuit at an appropriate time interval after the opening of solenoid valve 23. Furthermore, the propelling energy supply, instead of being compressed air, may be mechanical or chemical in nature, such as a stressed spring, or gunpowder or rocket propellant.

The essence of the invention thus comprises the concept of maintaining the charge or charges and the connecting firing leads in a central location protected within the launcher tube until the moment detonation is desired, and then detonating the charge or charges in motion through the air when the desired distribution is reached. The scope of the invention should therefore properly be ascertained by reference to the accompanying claims.

I claim:

1. In the method of generating seismic waves by detonating a pattern of explosive charges in the air, the improvement comprising propelling a plurality of explosive charges simultaneously upwardly into the air and radially outwardly from a given center point, simultaneously propelling a detonating charge substantially vertically into the air, paying out a detonating fuse connection from each of said charges to said detonating charge as said charges move radially outwardly therefrom, maintaining an electrical detonating connection between said detonating charge and an actuating circuit as said detonating charge rises in the air, and detonating said detonating charge through said electrical connection whereby the detonating fuse connections from said charge to each of said plurality of charges are actuated to detonate all of said plurality of charges substantially simultaneously at a desired pattern position in the air.

2. In the method of generating seismic waves by detonating a pattern of explosive charges in the air, the improvement comprising simultaneously propelling upwardly into the air from a vertically aimed launching tube and rotating as a unit a bundle of explosive charges, paying out a detonating connection from each charge of said bundle to a common center point as each of said charges moves radially outwardly from said center point due to the rotational velocity of said bundle, and detonating said charges substantially simultaneously through said connection when they reach a predetermined height and pattern position while moving through the air.

3. Apparatus for generating seismic waves by detonating an explosive charge in the air comprising an upwardly aimed launching tube, a container of compressed gas, a conduit including a solenoid-operated quick-opening valve connecting said container and the lower end of said launching tube, means for operating said valve from a distance, an explosive charge within said tube, electrical firing leads connected to said charge and adapted to be payed out as said charge moves through the air, and electrical detonating circuit means located at a distance from said tube and connected to said leads for detonating said charge as it moves through the air.

4. Apparatus according to claim 3 including a switch in one of said leads actuated by the paying out of said leads to close said circuit and detonate said charge at a predetermined position in the air.

5. Apparatus for generating seismic waves by detonating a pattern of explosive charges in the air comprising an upwardly aimed launching tube, a plurality of explosive charges in said tube, means for simultaneously propelling upwardly and rotating said charges as a unit within said tube so that said charges emerge from the upper end of said tube with substantial vertical and rotational velocities whereby they rise in the air and move radially outwardly from said tube, a detonating connection adapted to be payed out from a common center point to each of said charges, and means for detonating said charges substantially simultaneously through said connection as they move through the air and reach a predetermined pattern position.

6. Apparatus according to claim 5 including a detonating charge at said center point to which each said detonating connection is attached, and electrical firing leads coupled to said detonating charge and adapted to be payed out as it rises in the air.

7. Apparatus according to claim 6 including an electrical circuit comprising a voltage source connected to said electrical leads, and a switch in series with said source and actuated by the paying out of said leads.

References Cited in the file of this patent

UNITED STATES PATENTS

| Re. 17,242 | McCollum | Mar. 19, 1929 |
| 644,896 | Coneys | Mar. 6, 1900 |
| 1,235,637 | Barlow | Aug. 7, 1917 |
| 1,325,776 | Barlow | Dec. 13, 1919 |
| 1,899,970 | McCollum | Mar. 7, 1933 |
| 2,379,203 | Vertzinsky | June 26, 1945 |
| 2,475,875 | Burrows et al. | July 12, 1949 |
| 2,545,380 | Poulter | Mar. 13, 1951 |